United States Patent [19]
Dooley et al.

[11] 3,806,654
[45] Apr. 23, 1974

[54] ARRANGEMENT FOR TRANSMITTING DIGITAL PULSES THROUGH AN ANALOG TDM SWITCHING SYSTEM

[75] Inventors: Gerald F. Dooley, Galion; Marvin E. Monroe, Columbus, both of Ohio

[73] Assignee: North Electric Company, Galion, Ohio

[22] Filed: May 26, 1971

[21] Appl. No.: 146,913

[52] U.S. Cl. ..... 179/15 AF, 179/15 AT, 179/15 BY
[51] Int. Cl. .... H04j 3/06
[58] Field of Search ........ 179/15 AF:15 BY, 15 AT, 179/15 BV, 15 BA, 15 AC, 15 BM

[56] References Cited

UNITED STATES PATENTS

| | | | |
|---|---|---|---|
| 3,632,882 | 1/1972 | Ciecierski | 179/15 BA |
| 3,213,201 | 10/1965 | Flood | 179/15 AC |
| 3,558,823 | 1/1971 | Brilliant | 179/15 AC |
| 3,529,088 | 9/1970 | Hauer | 179/15 BM |
| 3,652,800 | 3/1972 | Dooley | 179/15 BA |
| 3,504,287 | 3/1970 | Deregnaucourt | 179/15 BS |
| 3,575,557 | 4/1971 | McCowen | 179/15 BA |
| 3,569,631 | 3/1971 | Johannes | 179/15 BA |
| 3,564,414 | 2/1971 | Ebert | 179/15 BA |
| 3,458,659 | 7/1969 | Sternune | 179/15 AQ |

OTHER PUBLICATIONS

Proceedings of the IEE; "Time Compression Multiplex Transmission;" by J. E. Flood et al.; Vol. III, No. 4, April 1964; pp. 647 et seq.

*Primary Examiner*—Kathleen H. Claffy
*Assistant Examiner*—David L. Stewart
*Attorney, Agent, or Firm*—Johnson, Dienner, Emrich, Verbeck and Wagner

[57] ABSTRACT

A time division multiplex switching system for transmission of digital pulses from asynchronous pulse transmitters in which each incoming data stream is buffered until occurrence of an assigned time slot. During each such assigned time slot, a high speed clock subdivides the time slot into a plurality of subintervals during which data pulses and stuff pulses, as required, are transmitted through a switching matrix in a three level code. The data pulses are then detected, separated from the stuff pulses, and buffered. The original input pulse rate is regenerated and the data pulses are transmitted to the digital receivers at approximately such rate.

15 Claims, 43 Drawing Figures

INVENTORS
GERALD F. DOOLEY
MARVIN E. MONROE

BY Johnson, Dienner, Emrich, Verbeck & Wagner
ATTORNEYS

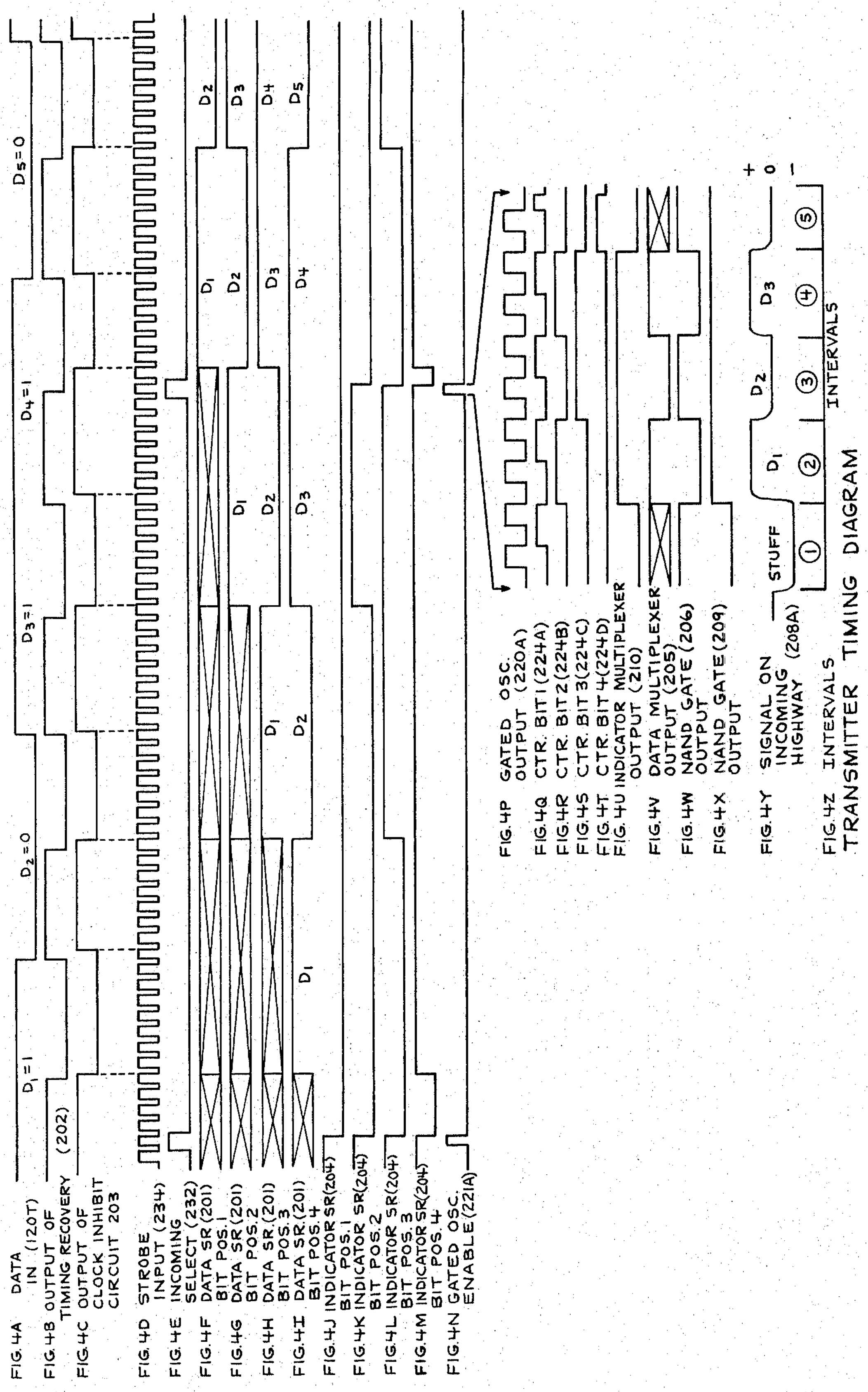
FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, FIG. 4N, FIG. 4P, FIG. 4Q, FIG. 4R, FIG. 4S, FIG. 4T, FIG. 4U, FIG. 4V, FIG. 4W, FIG. 4X, FIG. 4Y, FIG. 4Z

RECEIVER TIMING DIAGRAM

ARRANGEMENT FOR TRANSMITTING DIGITAL PULSES THROUGH AN ANALOG TDM SWITCHING SYSTEM

BACKGROUND OF THE INVENTION

1. Field of the Invention

This invention relates to time division switching systems having digital pulse stream transmission capabilities.

2. Description of the Prior Art

In a copending application No. 40,826 filed by Gerald F. Dooley on May 27, 1970 which issued as U.S. Pat. No. 3,652,800 on Mar. 28, 1972, a time division multiplex switching system was disclosed which was operable to transmit digital information through an existing analog time division switching matrix. This was accomplished by the replacement of analog transmitter circuits and analog receiver circuits with digital transmitter circuits and digital receiver circuits.

The pulses incoming from a digital source were buffered and stored in the sequence of arrival until the occurrence of an assigned time slot. During the occurrence of an assigned time slot, the next pulse to be switched was taken from the buffer, passed from the digital transmitter circuit, through a PAM interhighway switching arrangement, to a digital receiver circuit. In the digital receiver circuit, the pulses were again buffered and transmitted out to the digital receiver at a uniform rate.

In the prior art, the basic sampling rate of the analog time division switching matrix was 12.5 KHz, that is a frame repetition rate of 12,500 frames per second. Where one time slot per frame was assigned to the digital connection a pulse rate of 12.5 kilobits per second resulted. A greater pulse rate was obtained by assigning a plurality of time slots per frame to each digital connection. In one example of an embodiment of the prior art, an increased pulse rate of from 37.5 kilobits per second up to 50 kilobits per second was obtained by assigning four times slots per time frame.

In accommodating asynchronizaton between the time slot sampling rate and the digital transmitter pulse rate an assigned time slot may occur when there is no data pulse to be switched from the digital transmitter circuit to the digital receiver circuit. During this time slot a stuff pulse is generated by the digital transmitter circuit which indicates the absence of a data or information pulse to the digital receiver circuit.

Thus, although the copending application provides for up to 50 kilobits per second to be transmitted in a system having a basic sampling rate of 12.5 KHz, four time slots per time frame were required for this transfer.

SUMMARY OF THE INVENTION

The novel arrangement of the present disclosure pertain to the ability to transmit digital data pulses through an existing analog, pulse amplitude modulated (PAM), time division multiplex (TDM) switching matrix. To incorporate a digital switching capability in the analog switching system, an analog line circuit is replaced by a digital line circuit. The digital line circuit consists of three major portions, a transmitter circuit, a receiver circuit, and common timing circuits. The transmitter circuit includes a means for buffering the incoming data pulses from the digital transmitter of a digital terminal instrument and storing the data pulses in the sequence of arrival until the occurrence of an assigned time slot, which is indicated by a logic signal on an incoming select line coincident with a strobe pulse. During the assigned time slot all of the data pulses received since the occurrence of the last incoming select pulses are passed from the digital transmitted circuit via an incoming highway through the PAM interhighway switching arrangement and via an outgoing highway to the appropriate digital receiving circuit to which a connection is established. In the digital receiver circuit, the sequence of data pulses received over the PAM interhighway switching arrangement are again buffered and transmitted out to the digital receiver of a digital terminal intrument at a uniform rate, which is determined by the rate of the pulses at the input to the digital receiver circuit.

If the basic sampling rate of the analog time division switching matrix is 12.5 KHz per second, that is, a frame repetition rate of 12,500 frames per second, a data pulse stream of up to, but not exceeding 12.5 kilobits per second can be switched by transmitting either a zero or a one data pulse during the assigned time slot, such that the average pulse transfer rate through the PAM interhighway switching arrangement equals the incoming data rate. Data pulse rate between 12.5 kilobits per second and up to but not exceeding 25 kilobits per second can be switched by transmitting one or two data pulses per assigned time slot; data pulse rates between 25 kilobits per second and up to but not exceeding 37.5 kilobits per second can be switched by transmitting two or three data pulses per assigned time slot; and data pulse rates between 37.5 kilobits per second and up to but not exceeding 50 kilobits per second can be switched by transmitting three or four data pulses during the assigned time slot. For example, if the incoming data rate is exactly equal to 50 kilobits per second or four times the basic sampling rate of the analog time division matrix, then exactly four data pulses will be transmitted during each assigned time slot. If the incoming data pulse rate is 45 kilobits per second, then three of every five time slots will pass four data pulses and the remaining two out of every five will pass three data pulses, thus achieving an average data pulse transfer rate of 45 kilobits per second. Thus, if we wish to accommodate data pulse rates up to and including 50 kilobits per second, then each time slot can be subdivided into four serial pulse intervals.

At data pulse rates lower than 50 kilobits per second, all four pulse intervals will not always contain data pulses.

Each interval which does not contain a data pulse will thus contain a stuff pulse. As the pulses are received from the PAM interhighway switching arrangement into the digital receiver circuit, a detector will distinguish between data pulses and stuff pulses. The data pulses will be buffered in a shift register, and the stuff pulses deleted. The average incoming data pulse rate will be regenerated by monitoring the average contents of the receiving shift register and maintaining it at a constant level. Thus, the data pulse transfer through the matrix is completely asynchronous with respect to the basic sampling rate of the analog TDM switching matrix.

It is therefore an object of this invention to extend the capability of existing analog time division switching matrices to be able to switch high-speed data pulse streams without any penalty to system switching capacity.

It is a further object of this invention to provide a means of switching plurality of asynchronous data pulse streams; that is selectively interconnecting pairs of asynchronous digital terminal instruments, via a TDM matrix, without requiring complex synchronization circuitry.

BRIEF DESCRIPTION OF THE DRAWINGS

FIGS. 4A–4Z comprise certain timing diagrams pertinent to the transmitting function.

DESCRIPTION OF A PREFERRED EMBODIMENT

SYSTEM ARRANGEMENT

Figure 1:
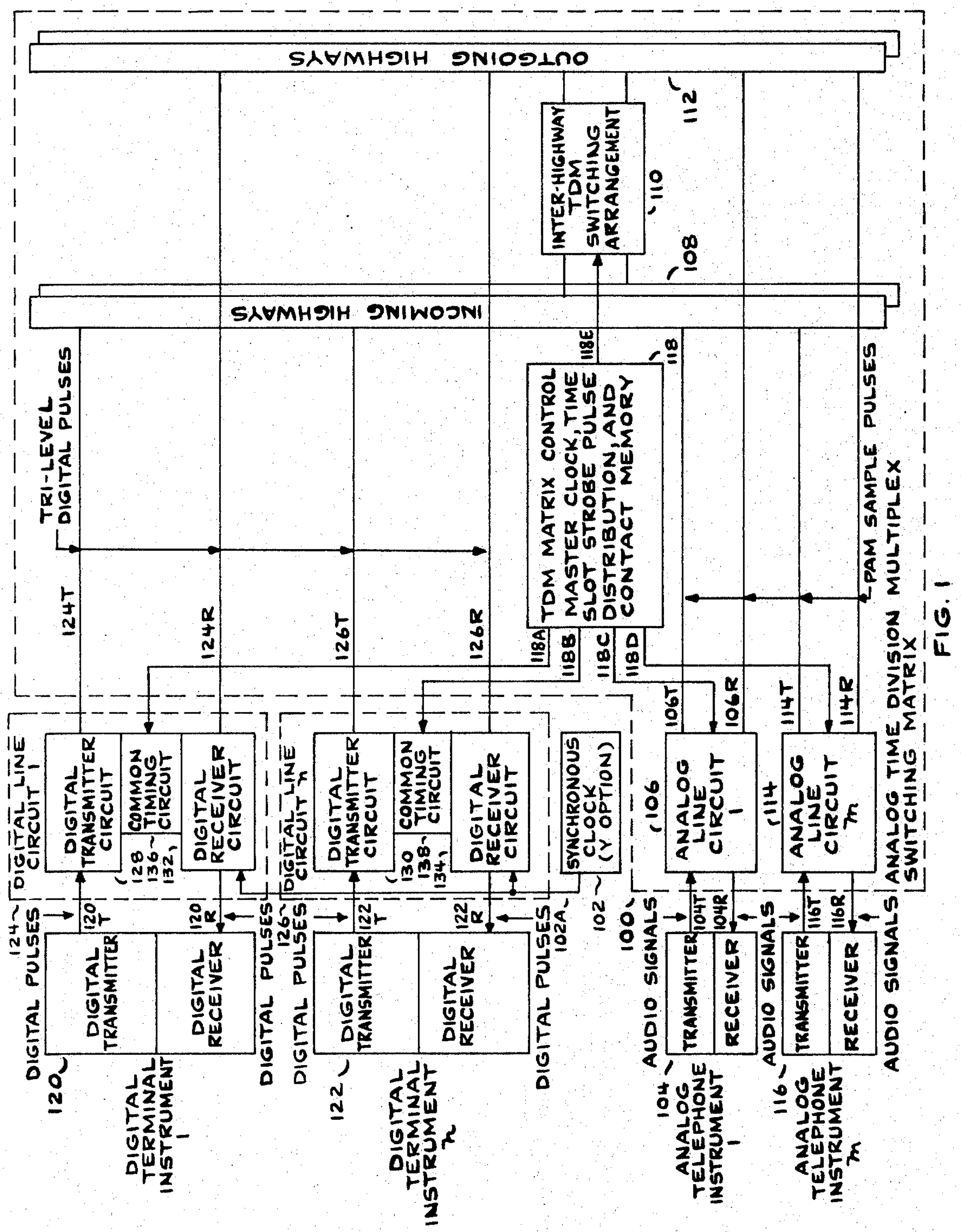
FIG. 1 is an overall block diagram of the system.

As represented in FIG. 1, the portion shown within the dotted line represents an existing analog time division switching matrix 100 including incoming highway system 108, an outgoing highway system 112, the interhighway switching arrangement 110, and a TDM matrix control 118. Audio signals originating in the transmitter portion of a first analog telephone intrument 104, are passed as PAM samples from the analog transmit portion of an analog line circuit 106 along a highway of incoming highway system 108, through interhighway switching arrangement 110, along a highway of outgoing highway system 112 to the analog receiver portion of another analog line circuit such as 114 where they are demodulated into audio signals which pass into the receiver portion of a second analog telephone instrument 116 in accordance with the desired connection. The interconnections are determined by information stored in a time slot or contact memory of the TDM matrix control 118 which drives the time slot pulse distribution circuitry of 118.

The analog time division switching matrix 100 is made available to digital terminal instruments 120, 122 by replacing existing analog line circuits with digital line circuits 124, 126. The digital line circuits 124, 126 are driven from the time slot memory and time slot pulse distribution circuitry of 118 in accordance with the desired connections.

The digital line circuit consists of three major elements, the digital transmitter circuit such as 128, 130, the digital receiver circuit such as 132, 134, and common timing circuit such as 136, 138.

DIGITAL TRANSMITTER CIRCUIT

Figure 2:
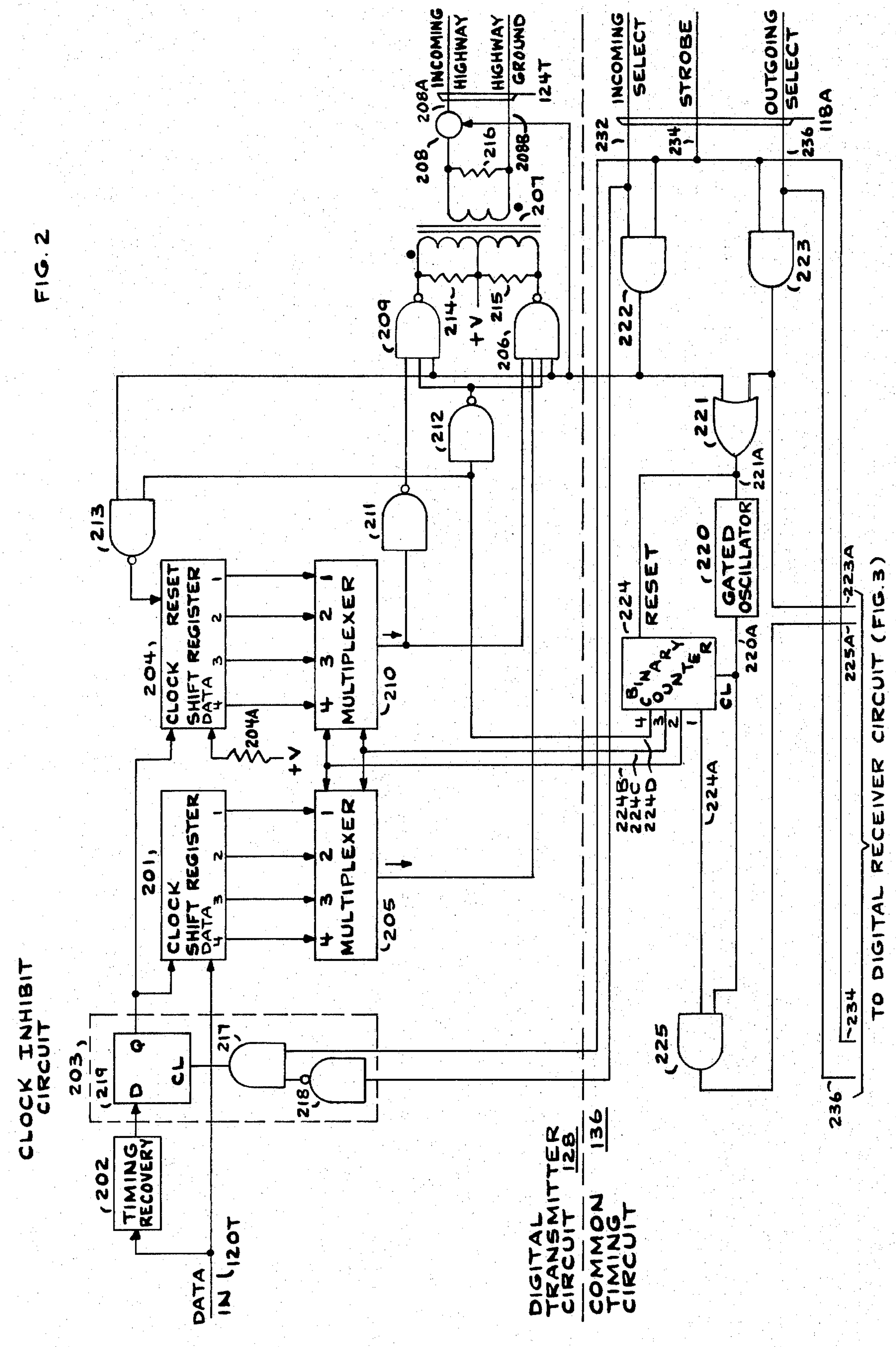
FIG. 2 is a diagram of a digital transmitter kcircuit and a timing circuit which is common to the digital transmitter circuit and the digital receiver circuit associated with a digital terminal instrument.

The digital transmitter circuit, such as 128, in one embodiment of this invention is shown in FIG. 2. In such embodiment, data pulses from a digital source such as from digital terminal instrument 120 of FIG. 1, over path 120T, are clocked into a shift register 201. The clock to enable the shift register 201 is derived from the incoming data pulse stream through a timing recovery circuit 202 and a clock inhibit circuit 203. The timing recovery circuit 202 includes an oscillator which runs at the speed of the incoming data stream and is synchronized thereby. Such type circuit is more fully disclosed in the above identified copending application along with circuits of the type which may be used for the blocks shown herein. The clock inhibit circuit 203, consisting of a delay flip-flop 219, AND gate 217 and inverter 218, prevents shifting of a data pulse into the shift register 201 during the occurrence of an assigned time slot of the frame of time slots used in the system, at which time the data pulses previously received are being transferred from the shift register 201 through the interhighway switching arrangement 110 to the digital receiver circuit, such as 134, of the selected digital line circuit 126. (The digital receiver circuit 134 for line circuit 126 is the same as digital receiver circuit 132 (FIG. 3) for digital line circuit 124 and hence the circuit of FIG. 3 will be used in describing the operation thereat.)

A clock pulse or strobe pulse is input over strobe conductor 234 during every time slot of the frame to AND gate 217. Normally, the utput of AND gate 217 follows the strobe input and provides a clock pulse during every time slot to the CL input of flip-flop 219, thus transferring a clock transition (if one occurred) from the input of delay flip-flop 219 to the output and hence to the clock input of shift registers 201 and 204. During the assigned time slot, the incoming select time slot signal over lead 232 to inverter 218 controls the converter 218 to inhibit AND gate 217 and hence a clock transition input to delay flip-flop 219 is held until the next time slot. As the received data pulses are shifted into the shift register 201, indicator pulses are shifted into a second shift register 204 by reason of the permanent connection of the data terminal via register 204A to +V. The indicator pulses denote that data pulses have been received and clocked into the specific cells of the shift register 201. This information is used during the assigned time slot to indicate how many data pulses have been received since the last occurrence of a time slot. During the assigned time slot, the common timing circuit such as 136 generates a high speed clock which subdivides the time slot interval into five intervals. The first four intervals are utilized to transmit data pulses or stuff pulses to the digital receiver circuit such as 134 of the selected digital line circuit such as 126. The fifth interval is a reset interval utilized to clear the shift register 204 in the digital transmitter circuit 128, thus preparing it to receive indicator pulses.

During the first interval, bit position number 1 in the indicator shift register 204 is examined. If this bit position contains a logic 1, indicatin that bit position 1 in the data shift register 201 contains a data pulse not yet transferred, then this data pulse is transferred through he multiplexer 205 and the NAND gate 206 to the primary of the transformer 207. If the data pulse stored in bit position 1 in data shift register 201 is a logic 1 then a positive pulse is transmitted to the secondary of the transformer 207, through the sampling gate 208 to the incoming highway 208A. Sampling gate 208 is operated by the occurrence of a logic signal on the incoming select line 232 and a pulse on the strobe line 234. If the data pulse stored in bit position 1 of shift register 201 is logic level 0, then no pulse is transmitted to the secondary of the transformer 207 and hence out on to the incoming highway 124T.

If the indicator bit in bit position 1 of shift register 204 is a logic 0, then a pulse is transmitted through NAND gate 209 to the primary of the transformer 207 and appears on the secondary of the transformer 207 and hence out on to the incoming highway 124T as a negative pulse. Thus, a data pulse is transmitted through the interhighway switching arrangement as either a positive pulse, representing a logic 1 or no pulse, representing a logic 0, and a stuff pulse, (or the absence of a data pulse) is transmitted as a negative pulse. This logic is accomplished through NAND gates 206 and 209, inverters 211 and 212, and the transformer 207. The indicator bit from shift register 204 is connected to NAND gate 206 and its complement is connected to NAND gate 209 through inverter 211. The other inputs to NAND gate 206 consist of (a) the selected data pulse from the data shift register 201 passed through the multiplexer 205, (b) the time slot select pulse for the incoming highway, and (c) an enable pulse for the four active intervals through inverter 212. If the indicator bit from shift register 204 is 0 and hence a stuff pulse is to be transmitted, then the output of NAND gate 206 is a logic level 1 and the output of NAND gate 209 is a logic level 0, thus causing current to flow from the +V supply through the center tap of the primary of the transformer 207 into NAND gate 209 thus creating a negative pulse on the secondary of the transformer 207. If a data pulse is to be transmitted, the indicator bit is a logic 1, and the output of NAND gate 209 is a logic level 1; and, if the data pulse is a logic 1, the output of NAND gate 206 is a logic 0. This causes a current to flow from +V supply through the center tap of the primary of the transformer 207 into NAND gate 206 thus generating a positive pulse on the secondary of the transformer 207. If a data pulse of logic 0 value is to be transmitted, then the outputs of NAND gate 206 is a logic 1 and the output of NAND gate 209 is a logic 1, thus causing no current to flow in the primary of the transformer 207 and hence, no pulse in the secondary of the transformer 207. Resistors 214, 215 and 216 are used to match the impedance of the incoming highway.

The same logic operates during the timing intervals 2, 3, and 4 thus examining bit positions 2, 3, and 4 of data shift register 201 and transmitting either the data pulse or a stuff pulse.

The bits in the data shift register 201 and the indicator shift register 204 are examined one at a time during the timing intervals through the use of multiplexers 205 and 210. The multiplexer 210 will gate one of the four inputs to the output, dependent on the two bit address code presented to it. Thus, if the address code is 00, input number 1 appears at the output; if the address code presented is 01, input number 2 is gated to the output; if the address code is 10, input number 3 is gated to the output; and if the address code is 11, input number 4 is gated to the output. The address code presented to the two multiplexers 205, 210 are derived in the common timing circuits, such as 136, and are 00 during timing interval 1, 01 during timing interval 2, 10 during timing interval 3, and 11 during timing interval 4.

During timing interval 5, the output of inverter 212 is a logic 0, causing the outputs of NAND gates 206 and 209 to be logic 1, and no current flows in the primary of transformer 207. The inputs to NAND gate 213 are both logic 1 and the output is logic 0, thus resetting indicator shift register 204, clearing it after all received data pulses have been transmitted through the interhighway switching arrangement.

Thus, the digital transmitter circuit 128 receives data pulses from the incoming line, stores then sequentially in the order received in the data shift register 201 and during the assigned time slot transmits all the data pulses received since the last time slot in the incoming highway.

COMMON TIMING CIRCUIT

The common timing circuits, such as circuit 136 (or 138), represented in the lower portion of FIG. 1, consist of a gated oscillator 220, a binary counter 224, and several logic gates. For the embodiment described here, the basic sampling rate of 12.5 KHz and the consequent 80 msec frame is divided into 48 time slots of 1.667 msec width. Each time slot is divided into a 960 nsec active interval and a 707 nsec guard interval. The gated oscillator 220 generates a 10.42 megahertz clock whenever the input is a logic 1. The gated oscillator 220 is turned on during an assigned transmit or receive time slot. This is accomplished through AND gates 222 and 223 and OR gate 221. Thus, if a signal on the incoming select line 232 is present and the pulse on strobe line 234 is present, the output of AND gate 222 is a logic 1 and the output of OR gate 221 is a logic 1. Also, if the signal on outgoing select line 236 and the pulse on strobe line 234 are logic 1, the output of AND gate 223 and the output of OR gate 221 are logic 1. Both of these conditions turn on the gates oscillator 220. The output of the gated oscillator 220 steps a four-bit binary counter 224 which subdivides the time slot into the five timing intervals. The output of the binary counter indicates which of the timing intervals is present. A master reset pulse is generated during timing interval 5, and passed to NAND gate 213 in the transmitted circuit which resets the indicator shift register. Timing pulses are generated by the common timing circuits such as 136 during the center of timing intervals 1, 2, 3, and 4, through AND gate 225. These clock pulses are utilized in the digital receiver circuit to clock data or stuff pulses received from the outgoing highway into a shift register.

DIGITAL RECEIVER CIRCUIT

Figure 3:
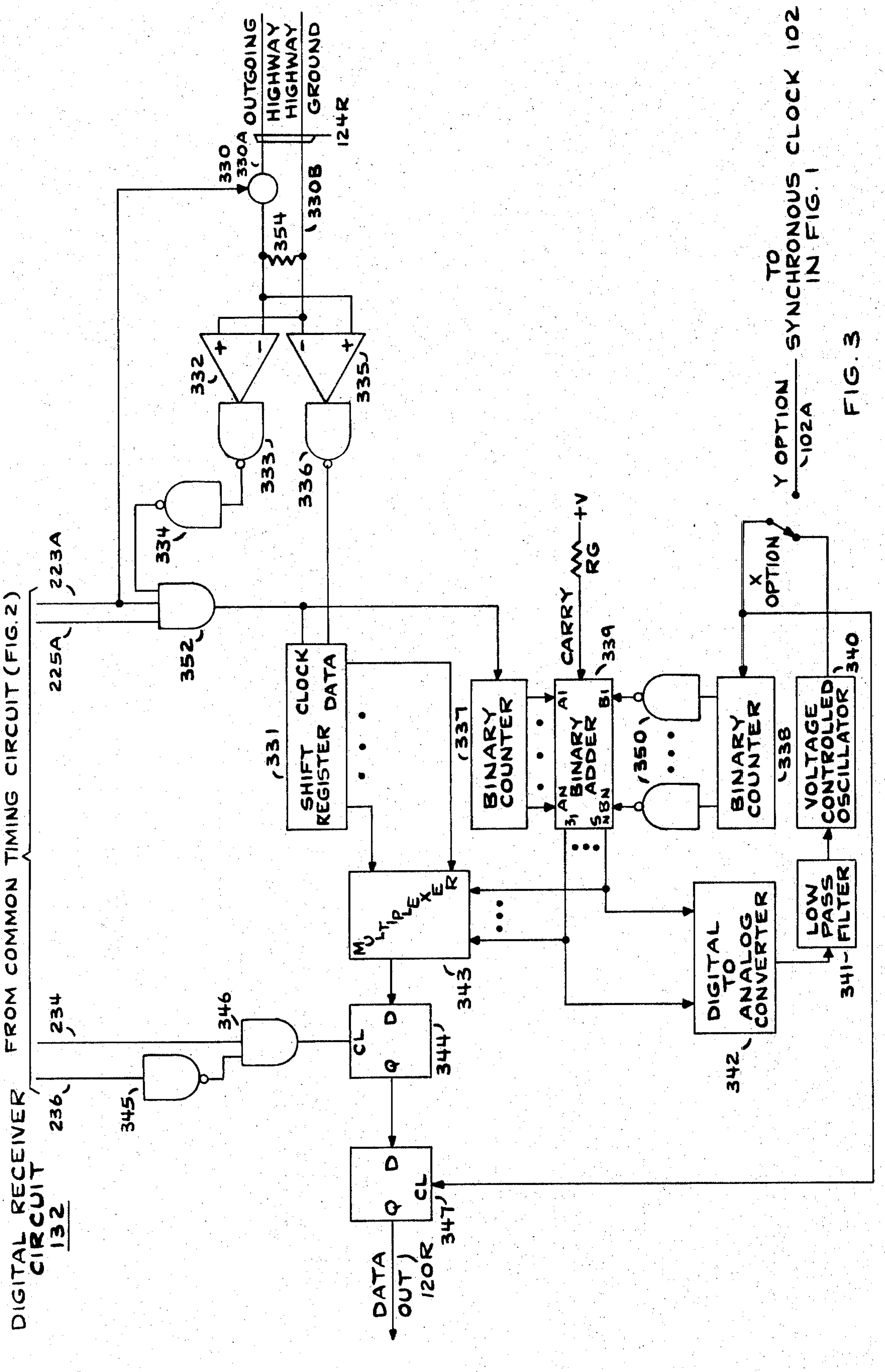
FIG. 3 is a diagram of a digital receiver circuit.

Referring to FIG. 1, pulses from digital circuit 128 pass over the incoming highway path 124T of the incoming highway system 108, through the interhighway TDM switching arrangement 110 to an outgoing highway path such as 126R, for example, of the outgoing highway system 112 to a digital receiver circuit 134. Although FIG. 3 is the diagram of digital receiver circuit 132 it can be used to illustrate the receipt of pulses in digital receiver circuit 134, as these circuits are identical. Accordingly, pulses from the outgoing highway are received through a sampling gate such as 330, with resistor such as 354 terminating the path. Received data pulses are shifted into shift register 331 for later transmission out to a data receiving device such as digital terminal instument 112 which is similar to digital terminal instrument 120.

The data and stuff pulses output from the transmitter circuit in the connection are extended over an incoming TDM highway through the interhighway TDM switching arrangment to an outgoing highway to the digital receiver circuit 134 which is used in the connection but which is the same as illustrated circuit 132. The detection of the stuff pulses on the outgoing highway is accomplished through a differential amplifier 332 and inverter 333. If a stuff pulse is received by differential amplifier 332, the output of the inverter 333 is logic level 1. The output of inverter 334 is logic level 0 whereby AND gate 352 is disabled to inhibit the clock pulse into the shift register 331.

When data pulses are present on the outgoing highway 124R, and hence received by differential amplifier 335, the output of inverter 336 will present the logic level of the received data pulse to shift register 331. Thus, if a data pulse 1 is present on the outgoing highway 124R indicated by a positive pulse, the output of inverter 336 is logic 1. Since there is a valid pulse, gate 352 will pass a clock pulse to clock the data pulse into the shift register 331. If no pulse is present on the outgoing highway 124R, the received data pulse is logic 0 and output of the inverter 336 is a logic 0, thus causing a 0 to be shifted into the shift register 331.

More specifically, it should be noted that the digital receiver in the connection is also controlled during the same randomly assigned time slot of the system in which the transmitter and interhighway gate is activated to process the pulses which are provided by the transmitter circuit in the connection. The particular one of the randomly selected time slots of the TDM system which is assigned to the connection is designated the outgoing select pulse in FIG. 2, digital transmitter 128 and 130 being identical. As such time slot occurs in a frame, the outgoing select pulse on conductor such as 236 and the strobe pulse which occurs in the concurrent time period on conductor such as 234 enable gate 223 which, via OR gate 221, enable gated oscillator circuit 220 to clock the binary counter 224 at a frequency rate of 10.42 MHz. The output of the gated oscillator 220 and the "1" output 224A of the binary counter 224 are fed to AND gate 225 (which is responsively enabled on every second output pulse of the oscillator 220 — i.e. every second pulse from the oscillator results in a logic 1 output on conductor 224A). In this manner, the time period of the outgoing select pulse (which is synchronized with the incoming select pulse used at the transmitter) is broken into five intervals which are fed as four clock pulses over conductor 225A to gate 352 as a time reference in the receiver circuit for the four transmitted pulses.

As noted above, if the incoming pulse on conductor 330A is a stuff pulse, gate 352 is inhibited whereby it does not provide the clock to shift register 331 whereby the stuff pulse is, in effect, discarded. However, if the input pulse is a data pulse, gate 352 is not inhibited and extends the interval clock pulse to the shift register 331 to clock the data pulse into the shift register 331.

When the data pulse is received, the interval clock pulse which clocks the pulse into shift register 331 also increments a binary counter 337 to indicate that one more data pulse has been received.

A second binary counter 338 is incremented every time a data pulse is transmitted out of the shift register 331 onto the data output line through flip-flop 347. The count from binary counters 337, 338 is input to binary adder 339, the signals from binary counter 338 being inverted by inverters 350. Thus, with the carry input always logic 1 through the +V and RG, the difference between the two binary counters 337, 338 is determined by binary adder 339, and indicates the number of data pulses present in shift register 331. That is, if the received data signals are being clocked into shift register 331 faster than the pulses are being read out, he number will increase. This number is input from binary adder 339 to the digital-to-analog converter 342 thus generating an output voltage which is a linear functon of the number of data pulses in the shift register 331. This output voltage is passed through a low-pass filter 341 to the input of a voltage controlled oscillator 340 in the X option, which controls the flip-flop 347 to apply the pulses to the data output circuit 120R.

In the X option, the output frequency of the voltage controlled oscillator 340 will vary as a function of the input voltage. As the input voltage is increased (i.e. a larger number of pulses is stored in shift register 331) the output frequency will increase. As the input voltage is decreased, the output frequency will decrease. Thus, the frequency of the voltage controlled oscillator 340 is adjusted to control the rate at which the data pulses are presented to the output data line 120 via flip-flop 347. Thus as the number of data pulses stored in shift register 331, but not yet transmitted to the output data line, begins to increase, the voltage controlled oscillator 340 will increase in frequency and thus, control flip-flop 347 to transmit data pulses to the output data line 120R at a higher rate. As the number of data pulses stored in shift register 331, but not yet transmitted, decreases, the output of the voltage controlled oscillator 340 will decrease and hence, data pulses are presented to the output data line at a lower rate. This basic rate regeneration technique operates on the principles of a phase-locked loop.

The output of the binary adder 339, representing the difference between the number of data pulses received as indicated by binary counter 337 and the number of data pulses transmitted as indicated by binary counter 338, is also presented to the multiplexer 343 which selects the appropriate bit from the shift register to be transmitted to the outgoing data line. The output of the multiplexer 343 is clocked into a delay flip-flop 344 by the occurrence of a strobe pulse from gate 346. The output of delay flip-flop 344 is then clocked in to a second delay flip-flop 347, as noted above, by the output of the voltage controlled oscillator 340. A strobe pulse occurs on lead 234 during every time slot and hence the output of AND gate 346 contains a clock pulse during every time slot except the assigned time slot. More specifically, during the time slot assigned to the receiving circuit, when data pulses are being shifted into the shift register 331, the output of inverter 345 is logic 0, thus inhibiting AND gate 346, whereby the gating of the output of the multiplexer 343 into delay flip-flop 344 is inhibited, thus preventing an erroneous output from occurring on the output data line as data pulses are shifted into shift register 331. This erroneous output could occur from the difference in the speed of operation of the shift register 331, the multiplexer 343, binary counters 337 and 338 and the binary adder 339.

Thus, the digital receiver circuit 134, which is the same as digital receiver circuit 132, receives data and stuff pulses from the outgoing highway 124R of the outgoing highways 112, deletes the stuff pulses, and buffers the data pulses for transmission to the output data line at an average rate equal to the average rate that the data pulses are received from the outgoing highway of 112.

WAVEFORMS

As a further aid to an understanding of the operation of the transmitter circuit 128, a set of waveforms is set forth in FIGS. 4A–4Z. It will be recalled that, in the inventive structure, the data pulse information is transmitted from transmitter circuit such as 128 to a receiver circuit such as 134 in a single, randomly assigned time slot of successive frames and that the transmitter circuit has associated timing circuitry for partitioning such time slot into five intervals, four of which are used to transmit data or stuff pulse information. If four pulses have been buffered or stored, each of the four intervals is used transmit a corresponding data pulse. However, if only three data pulses have been stored at time the randomly assigned time slot for the connection occurs in a frame, a stuff pulse is generated for transmission with the three data pulses. Such mode of operation comprises an important feature of the invention.

With reference now to FIG. 4A, the waveform there shown illustrates five data pulses D1–D5 of a pulse stream incoming over the data input circuit 120T (FIG. 2). It will be recalled that timing recovery circuit 202 comprises an oscillator operable to provide a pulse output (FIG. 4B) at the same frequency as the data stream shown in FIG. 4A. It will be apparent from FIGS. 4A and 4B that, as each trailing edge occurs in the data stream, the timing recovery circuit 202 synchronizes its oscillator output with the data stream input.

The TDM matrix control circuit 118 (FIG. 1) provides strobe pulses (FIG. 4D) over input conductor 234 in path 118A to the common timing circuit 136, and also to the clock inhibit circuit 203 via gate 217 (FIG. 2) at the 600 KHz rate (i.e. as shown in FIG. 4D). In FIG. 4E, a single time slot of 48 time slots per frame is shown.

As noted above, the data pulses are transferred over a connection from the transmitter circuit such as 128 over an incoming highway, through the interhighway TDM switching arrangement, and an outgoing highway to a receiver circuit 134 during one random assigned cyclic time slot in each frame. Such time slot is shown in FIG. 4E, and is identified as being determined by the incoming select pulses which are fed over path 232, once in each frame, to effect transmission of the data pulses which have been stored since the occurrence of the incoming select pulse in the previous frame.

With reference now to FIGS. 4B–4D, it will be seen that while the input to the clock inhibit circuit 203 occurs at the center of an incoming data pulse (see data pulse D1, for example), the output from inhibit clock circuit 203 to the shift registers 201, 204 is delayed until the trailing edge of the next strobe pulse (i.e. see trailing edge of strobe pulse in FIG. 4D and trailing edge of clock inhibit pulse in FIG. 4C).

However, if the incoming select pulse assigned to the connection is received over conductor 232 at the same time that the strobe occurs on conductor 234, gates 217, 218 delay the output of inhibit circuit 203 until the trailing edge of the next strobe pulse (see data pulse D4, for example). Such mode of operation is provided to delay clocking of a data pulse into the shift register 201 during the same period the data pulses are being transferred from the shift register 201. Such timing is further discussed herein below.

With reference now to FIGS. 4A, 4C, 4I, it will be seen that the first data pulse D1 of the input pulse stream in the present example is clocked into the shift register 201 by clock inhibit circuit 203 (FIG. 4C) at the approximate center of data pulse D1 and that such clocking timg is determined by the trailing edge of the pulse output of the clock inhibit circuit 203 (FIG. 4C).

As data pulse D2 (FIG. 4A) is input to the system, the trailing edge of the succeeding output pulse of circuit 203 (FIG. 4C) clocks the data signal D2 (FIG. 4I) into shift register 201 which causes data pulse D1 to be shifted into the second bit position of the shift register 201 (FIG. 4H). In a similar manner, the third data pulse D3 is clocked into shift register 201 as the third trailing edge output from clock circuit 203 occurs and stored data pulses D1, D2 are shifted one bit position to the right (bit positions 2 and 3 respectively) (See FIGS. 4G, 4H.).

Since the next time slot assigned to the connection (incoming select pulse — FIG. 4E) occurs before the next trailing edge of the clock inhibit circuit 203, the fourth data pulse D4 which appears at the input 120T will not be clocked into the shift register 201 by reason of the fact that the clock inhibit circuit disables further input thereto. That is, as the second incoming select pulse is received during the time slot of the succeeding frame (FIG. 4E, second pulse), this incoming select pulse (FIG. 4D) will cause gate 218 to inhibit gate 217 preventing the strobe pulse which occurs during this incoming select pulse from clocking flip-flop 219 thereby controlling clock inhibit circuit 203 to inhibit further data input to clock shift register 201. Summarily, although four pulses D1–D4 are input to the system over input 120T prior to the recepit of the next incoming select pulse, only three of the data pulses will be clocked into shift register 201 (i.e., bit positions 4, 3, 2 respectively). If will be shown during readout that a stuff pulse is generated and forwarded with the three stored data pulses over the incoming highway.

The same signals on conductor 232, 234 which control circuit 203 to inhibit input of the fourth data pulse D4 to shift register 201 also enable gate 222 to provide a pulse (FIG. 4N) over OR gate 221 to release binary counter 224 from its reset condition and start gated oscillator 220. With the enablement of gate oscillator 220, which operates at a frequency of 10.42 MHz (FIG. 4P), the output pulses over conductor 220A control binary counter 224 to advance one count with each pulse input thereto, and he resultant signals output therefrom over conductors 224B and 224C are applied to the multiplexers 205, 210 as successive address signals of the bit positions thereof whereby during successive intervals (FIG. 4Z) the information in these bits positions is gated from shift registers 201, 204 to the pulse output circuit 211, 212, 209, 206 in the first four intervals. It is noted that two pulses from the oscillator to the binary counter 224 are required to effect each of five intervals.

It will be recalled that, since only three data pulses were shifted into shift register 201, bit position 1 of shift register 204 will have a logic 0 at its bit position 1 (i.e. to indicate that the information in shift register 201 is not a data pulse received during the current input period), i.e. since the last reset of shift register 204. Such logic level in the first bit position indicates to the system that a stuff pulse must be generated during the first interval and accordingly a pulse output over multiplexer 210 to the pulse output circuits will result in the generation of a stuff pulse in the manner previously described.

In a similar manner, during the second interval the binary counter 224 addresses the multiplexers 205, 210 which responsively provide the output of the data pulse D1 in the second bit position of shift register 201 to pulse generating circuit; during the third interval the multiplexer 205, 210 provide the data pulse D2 in the third bit position of the shift register 201 to the pulse generating circuit; and during the fourth interval the multiplexers provide the data pulse D3 from bit position four of the shift register 201 to the pulse generating circuit. The resultant signal output over incoming highway 208 appears in FIG. 4Y.

At the start of the fifth interval, binary counter 224 advances to count 8 and the logic 1 output which occurs on conductor 224D is fed as one input to gate 213. The second input of gate 213 has had logic 1 thereon during the interval period 1–4 by reason of the strobe signal on lead 234 and the incoming select signal on conductor 232, during the assigned time slot via AND gate 222. As a result, gate 213 now provides logic 0 output to shift register 204 which resets in preparation to provide an indication of the next data pulses input to the data shift register 201.

After the incoming select pulse has terminated (i.e. the randomly assigned time slot has expired) the data pulse D4 is gated by the trailing edge of the following strobe pulse on lead 234 via circuit 203 into the shift register 201 in the manner described above.

Summarily stated, it will be apparent that the novel system is operative to divide a randomly assigned time slot into five intervals, four of which are used for the purpose of transmitting data and stuff information over the highways of an analog TDM matrix system.

As explained above, if only three data pulses are received during the period between as assigned time slot in two successive frames, the system is operative to automatically generate one stuff pulse for transmission with the three data pulses during the four intervals of the assigned time slot. In the event that only two data pulses are present, the system similarly generates two stuff pulses and if only one data pulse is present, the system generates three stuff pulses.

Figures 5A, 5B, 5C, 5D, 5E, 5F, 5G, 5H, 5I, 5J, 5K, 5L, 5M, 5N, 5P:
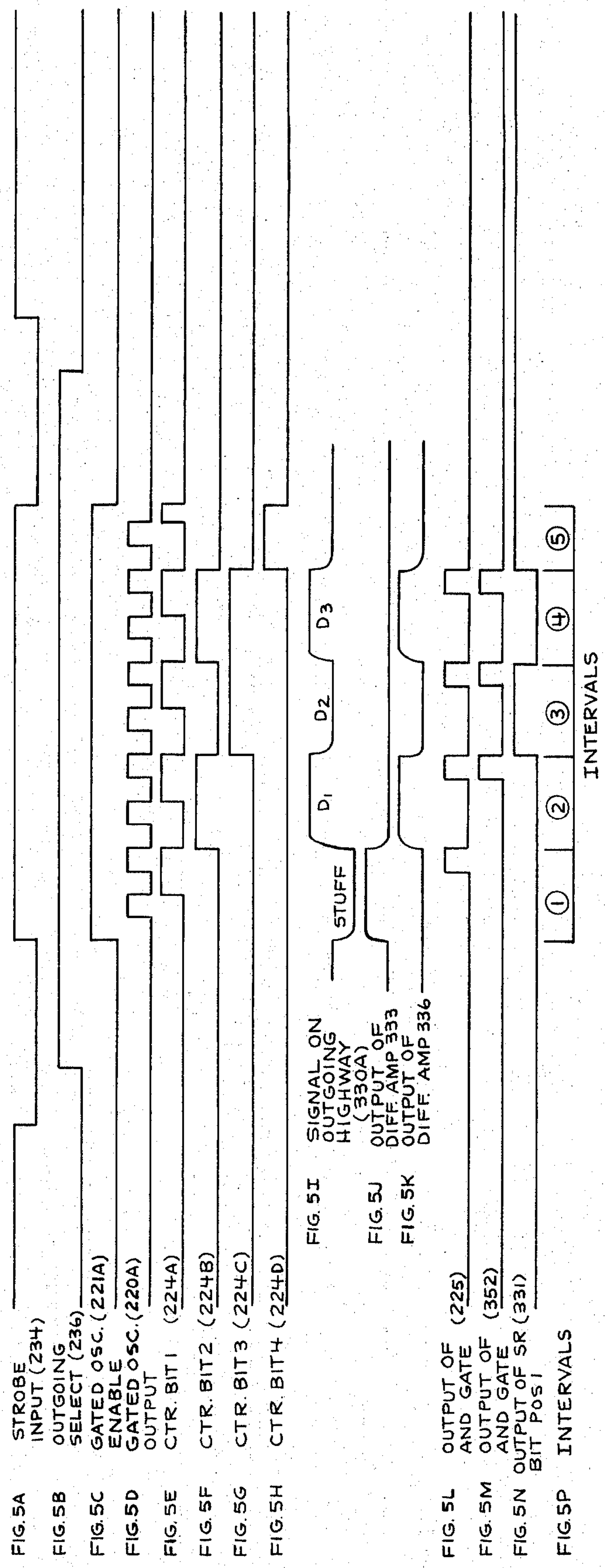
FIGS. 5A–5P comprise certain timing diagrams pertinent to the receiving function.

With reference now to FIGS. 5A–5S, the timing waveforms for the digital receiver circuits such as 132, 134 are shown thereat.

FIG. 5A once more sets forth the strobe signals which are provided over conductor 234 to the common timing circuit 136 but shown in FIG. 5A on a larger time base than was used in FIG. 4D.

The outgoing select pulse, which is the time slot randomly assigned for use by the digital receiver in a connection is fed over conductor such as 236 to enable the digital receiver for a period of one time slot during each frame and is shown in FIG. 5B.

With the occurrence of the outgoing select pulse on a conductor such as 236 (FIG. 5B) and a strobe pulse on a conductor such as 234 (FIG. 5A), gate 223 is enabled which via OR gate 221 starts the gated oscillator 220, the oscillator being enabled for a period which is determined by the width of the effective one of the strobe pulses (FIG. 5C).

Gated oscillator such as 220 operates as before to provide output pulses (FIG. 5D) at the frequency rate of approximately 10 MHz over conductor such as 224A to thereby clock binary counter such as 224 as described above. The output of the binary counter 224 shown in FIGS. 5E–5H (for reference purposes) is fed over conductors 224A–224D, it being apparent that only the output fed over conductor 224A through gate 225 is effective at this time to define the intervals of the assigned time slot (FIG. 5P).

As was described above, in the present example, a stuff pulse was provided during the first interval by the transmitter equipment. As a result, during the first interval (which is defined by the output of gate 225 over conductor 225A to gate 352) gates 332, 333, and 334 are operative in response to the stuff pulse to provide logic 0 to one input of gate 352 in the manner previously described. Gate 352 thereby prevents the clock output from gate 225 from reaching the shift register 331 and binary counter 337 during the first interval (FIG. 5M). During the succeeding three pulse intervals, however, the data pulses D1, D2, D3 are input over the highway such as 330A (FIG. 5I) and the output of differential amplifier 336 (FIG. 5K) will be clocked into shift register 331 by the clock pulses which are fed over gate 352 (FIG. 5M). By reason of the fact that data pulses have appeared on the outgoing highway, the data pulses are thus fed into the shift register 331 and the circuit operates as described above via the multiplexer 343 and flip-flops 344, 347 to gate the pulses over the data output 120R.

For simplicity, the description and the drawings thus far, have not indicated a time delay through gates 206 and 209 and transformer 207 and the interhighway TDM switching arrangement 110 to the outputs of inverters 333, and 336. Although some delay can be tolerated, delays, encountered in certain application, may require compensation by adding an equal delay to the output of gate 225 or by introducing multiple outputs (taps) on gated oscillator 220, where the relative phasing between a first output and a second output equals the delay and the first output clocks binary counter 224 while the second output (later in time) is input to gate 225. When this compensation is provided, waveforms shown in FIGS. 5I, 5J, 5K, 5L and 5M will be shifted to the right by an amount equal to the delay.

When this delay occurs, the waveforms shown in FIGS. 5I, 5J, and 5K will be shifted to the right by an amount equal to the delay. The compensation described above will shift the waveforms shown in FIGS. 5L, 5M and 5N to the right by an equal amount.

In certain applications, the digital terminal instruments, such as 120 and 122, are not synchronized with respect to each other. That is, they do not share a common timing source. In this case, after the data pulses are received through the TDM matrix by the digital receiver circuits, such as 132 and 134, they must be retimed for transmission to the respective digital receivers of 120 and 122, for example. This is achieved using the X option as hereinbefore described.

In certain other applications, the digital terminal instruments, such as 120 and 122, may be synchronized with respect to each other, by providing a common timing source for the data streams to all digital receivers of the digital terminal struments, such as 120 and 122, over paths such as 120R and 122R. In each digital terminal instrument, such as 120 and 122, this clock is extracted from the received data streams through a timing recovery circuit and is applied to the clocking of the data stream out of the associated digital transmitter. Thus, the average data rates transmitted and received over paths such as 120T, 120R, 122T, and 122R, are equal. In this case, the common timing source is provided through the synchronous clock 102 to the digital receiver circuits, utilizing the Y option.

What is claimed is:

1. In an analog time division switching system in which time slots are provided in a cyclic pattern for use in the establishment of a plurality of analog connections over gated highway means in the system and to which digital data pulses are provided by a digital source at a rate higher than the individual highway gate sampling rate of the analog time division switching system; digital transmitter means having input means connected to said digital source to receive digital data pulses output thereby, buffer means connected to said input means for storing the received data pulses, pulse generator means for selectively generating coded pulses to represent data pulses and stuff pulses for transmission over said gated highway means in said switching system, first means connected to said buffer means for providing marking signals to said pulse generator means during a single assigned time slot which indicate the coded pulses to be generated to represent the pulses which are stored in said buffer means, and second means connected to said input means for providing at least one marking signal to said pulse generator means to indicate the requirement for the generation of at least one stuff pulse whenever a predetermined condition exists in said buffer means during said assigned time slot, input means for said digital transmitter means over which a select pulse is received during said one assigned time slot of said cyclic pattern, timing means enabled by said select pulse to generate a plurality of control signals which define successive intervals in said one assigned time slot, means for connecting said control signals simultaneously to both said first means and said second means to enable the same to provide the marking signals for the data pulses and alternatively the marking signal for the stuff pulses during the successive intervals of said one assigned time slot, and output means connecting the marking signal output from said first and second means to said pulse generator means.

2. A system as set forth in claim 1 in which said pulse generator means for coding pulses for transmission over said gated highway means comprises gate means connected to said output means to provide pulse signals in a three level code, level one being provided for a stored logic 1 data pulse, level two being provided for a stored logic 0 data pulse, and level three being provided for a stuff pulse.

3. A system as set forth in claim 1 which further comprises digital receiver means having detector means connected to said highway means, register means connected to said detector means for storing the data pulses input thereto over said gated highways means, readout means connected to said register means for reading the data pulses out of said register means, and a control circuit connected to said readout means for enabling said readout means at a variable rate related to the number of data pulses which are stored in said register means.

4. A system as set forth in claim 1 in which said input means comprises means for preventing input of a data pulse to said buffer means during said assigned time slot to thereby prevent interference with the readout of the data pulses which are stored in said buffer means.

5. In an analog time division switching system in which data pulses having a rate higher than the individual highway gate sampling rate of the time division switching system are transmitted from digital transmitter means to digital receiver means over gated highway means in a single time slot of a cylic pattern of the analog time division switching system; said digital transmitter means having input means over which data pulses are received, buffer means connected to said input means for storing the received data pulses input from a digital pulse source outside said time slot, timing means comprising interval generating means for generating timing signals which divide an assigned time slot into a plurality of intervals, and control means connected to said interval generating means to provide a different output control signal during each of the successive time intervals of said one assigned time slot, pulse generator means for selectively generating coded pulses to represent data pulses and alternatively stuff pulses for transmission over said gated highway means of said time division switching system, first means having an input circuit connected to said buffer means, and a control circuit connected to said timing means enabled by said successive control signals in said one assigned time slot to provide first marking signals to said pulse generator means which indicate the data signals to be generated in certain ones of said intervals, means connecting said first marking signals to said pulse generator means during said certain intervals, and second means connected to said input means and to said timing means enabled by said successive control signals in said one assigned time slot to provide a further marking signal during at least one of the other intervals in said one time slot, and means connecting said further marking signal to said pulse generator means to enable generation of stuff pulses by said pulse generator means during said other interval.

6. A time division switching system as set forth in claim 5 in which said interval generating means comprises an oscillator circuit, and said control means comprises a binary counter circuit driven by said oscillator circuit to generate a different binary signal output during each of said intervals in said assigned time slot.

7. A time division switching system as set forth in claim 6 in which said first means comprises multiplexer means operative to effect readout of the information in said buffer means to said pulse generator means in response to said binary signals applied to the control circuit during the successive intervals in said assigned time slot.

8. A time division switching system as set forth in claim 6 in which said second means includes register means connected to said input means for storing indications of the number of data pulses stored in said buffer means, and decoding means connected to said register means and operated by said timing means to provide said further marking signals to said pulse generating means.

9. A time division switching system as set forth in claim 5 in which said first means comprises first multiplexer means and in which said second means comprises register means connected to said input means for indicating the positions in said buffer means having a stored data pulse thereat, and in which said second means further comprises second multiplexer means connected to said register means for effecting readout of said information from said register means, and in which said control means comprises means connecting the same control signals to said first and second multiplexer means to effect synchronous readout of like positions in said buffer and register means.

10. A time division switching system as set forth in claim 5 in which digital transmitter means has an associated digital receiver means in the system, and which includes means for connecting said timing signals to said associated digital receiver means to define the intervals of said one assigned time slot for said associated digital receiver means.

11. A time division switching system as set forth in claim 10 in which said associated digital receiver means comprises a clock gate connected to said timing means to receive said timing signals, circuit means connected to said gated highway means including detector means for detecting stuff pulses incoming to said digital receiver means over said gated highway means, and means connected to said detector means responsive to detection of an incoming stuff pulse to disable said clock gate, register means connected to said circuit means and said clock gate for storing incoming data pulses as enabled by said clock gate, and readout means connected to said register means for effecting selective readout of the data pulses stored in said register means.

12. A time division switching system as set forth in claim 11 in which said readout means comprises first stage means and output stage means, and transfer means connected to said register means for transferring said data pulses stored in said register means to said first stage means outside said time slot so as to avoid potential erroneous output while storing said incoming data pulses in said register means during said time slot, and means connected to said transfer means for effecting transfer of said data pulses from said first stage means to said output stage means at an adjustable rate which is controlled by the average difference in the rate of input of said incoming data pulses into said register means and the rate of readout from said register means.

13. A system as set forth in claim 5 in which said interval generating means are operative during an assigned time slot to provide said control signals asynchronously relative to the time slot frequency, and which includes means connected to said control means responsive to one of said control signals to reset said timing means.

14. In an analog time division switching system which has an analog time division switching matrix in which time slots of a cyclic pattern are assigned for use in establishing connections over said matrix; a plurality of digital terminal instruments, each of which provides a stream of data pulses and each of which is connected to a digital line circuit, each digital line circuit including digital transmitter circuit means and digital receiver circuit means, each digital transmitter circuit means comprising buffer means, input means connecting said buffer means to an associated one of the digital terminal instruments to transmit data pulses from the digital terminal instrument to said buffer means for storage, input means over which signals are received indicating the time slot assigned to the digital transmitter circuit means for use in establishing a path for said data pulses over said matrix, timing means in each digital line circuit connected to said input means for generating a different control signal during each of a plurality of successive intervals of the assigned time slot, pulse generator means in each digital transmitter circuit for generating coded data pulses and stuff pulses for selective transmission over said matrix, first means in each digital transmitter means connected to said buffer means enabled by said control signals during certain intervals in the assigned time slot to provide marking signals indicating the data stored in said buffer means, means connecting said marking signals to said pulse generator means to enable the same to transmit coded pulses, each coded pulse, representing a corresponding data pulse stored in said buffer means, second means connected to said input means operative to provide a further marking signal during at least one other of said intervals of said time slot whenever the number of data pulses stored in said buffer means are less than the number of said intervals, means for connecting said further marking signal to said pulse generator means, and means for connecting each control signal simultaneously to both said first and second means, different ones of the control signals being applied during correspondingly different ones of said intervals of said one assigned time slot.

15. A system as set forth in claim 14 in which each said digital receiver means includes means for storing the data pulses as received thereat, and means for regenerating the received data pulses at a uniform pulse rate.

* * * * *